(12) United States Patent
Jou et al.

(10) Patent No.: US 6,853,375 B2
(45) Date of Patent: Feb. 8, 2005

(54) METHOD FOR PREEMPTIVE SCREEN RENDERING

(75) Inventors: Stephan F. Jou, Nepean (CA); Don Campbell, Kanata (CA); Ian Ballantyne, Osgoode (CA)

(73) Assignee: Cognos Incorporated, Ottawa (CA)

( * ) Notice: Subject to any disclaimer, the term of this patent is extended or adjusted under 35 U.S.C. 154(b) by 387 days.

(21) Appl. No.: 09/852,924

(22) Filed: May 10, 2001

(65) Prior Publication Data

US 2002/0008699 A1 Jan. 24, 2002

Related U.S. Application Data

(60) Provisional application No. 60/202,911, filed on May 10, 2000.

(51) Int. Cl.[7] ............................................... G06T 17/00
(52) U.S. Cl. ....................................................... 345/420
(58) Field of Search .................................. 345/419, 420, 345/423, 427, 428, 581, 582, 587

(56) References Cited

U.S. PATENT DOCUMENTS 5,999,192 A * 12/1999 Selfridge et al. ........... 345/440
6,373,489 B1 * 4/2002 Lu et al. ..................... 345/428

* cited by examiner

Primary Examiner—Almis Jankus
(74) Attorney, Agent, or Firm—Gardner Groff, P.C.

(57) ABSTRACT

A method of rendering screen of a computer display device under conditions requiring frequent repainting of the screen is disclosed. The display is a part of a computer system running an application under control of an operating system. The application detects the onset of conditions requiring frequent repainting of the screen by checking messages sent by the operating system to the application's message queue. The application then starts the repainting of the screen based on the information retrieved from the queue while checking periodically the message queue to see if the originally detected conditions still apply. If this is the case, the application terminates the original repainting operation and starts a new repainting operation based on the updated information retrieved from the message queue. This cycle is repeated until it is determined that the originally detected conditions no longer apply, in which case a final complete repaint of the screen takes place. The method is particularly useful for the display of a graphically complex scene during a navigation operation, such as panning or zooming, when complete repainting of the scene as the navigation progresses fails to provide to the user an acceptable visual feedback of the navigation progress.

19 Claims, 4 Drawing Sheets

METHOD FOR PREEMPTIVE SCREEN RENDERING

CROSS REFERENCE TO RELATED APPLICATION

This document claims priority to and the benefit of the filing date of copending provisional application entitled INTERACTIVE BUSINESS DATA VISUALIZATION SYSTEM, assigned Ser. No. 60/202,911, and filed May 10, 2000, which is hereby incorporated by reference.

FIELD OF THE INVENTION

The present invention relates to a method of rendering screen graphics, in particular to a method of preemptive rendering of screen graphics of high degree of complexity under conditions requiring frequent repainting of the screen.

BACKGROUND OF THE INVENTION

The field of business applications of computer technology has seen many important changes over the last few years. With steadily growing computational power and data storage capacities of computer systems used for business data processing, the interest of the business community has shifted from transactional data management systems (on-line transaction processing systems, or OLTP systems, mostly supporting day-to-day business operations) and from relatively simple business data processing systems, towards sophisticated business management systems, such as enterprise resource planning (ERP) systems, integrating at the enterprise level all facets and functions of the business, including planning, manufacturing, sales and marketing. An example of a business management software package of this scope is SAP R/3 System available from SAP AG (Germany) or its U.S. branch, SAP America, Inc.

Among various alternative approaches to business data management and analysis developed over the last few years, many are related to data warehousing. A data warehouse can be defined broadly as a subject-oriented collection of business data identified with a particular period of time, as opposed to transactional databases dedicated to ongoing business activities. A scaled-down, usually single-subject oriented warehouse is sometimes referred to as a data mart. Data in a warehouse is normally gathered from a variety of sources (mostly various OLTP and legacy systems) and merged into a coherent whole. Data in a warehouse is usually stable, in that data is added to the warehouse but not removed. The latter feature, which is normally desirable to provide a more complete image of the business over time, may be absent from warehouses designed to keep data for a predetermined time span, with the oldest data being unloaded when the newest data is added.

As opposed to data stored in OLTP systems intended to support day-to-day operations and optimized for the speed and reliability of transaction updating, data stored in a data warehouse is intended to provide higher-level, aggregated views of the data, such as total sales by product line or region over a predetermined period of time, in support of business decision making. To provide consistently fast responses to such aggregate queries, data in a data warehouse or data mart must be structured in a manner facilitating the data synthesis, analysis, and consolidation.

The most characteristic feature of warehoused business data is its multidimensional view of a business, meaning that business data is organized according to major aspects and measures of the business, called dimensions, such as its products, markets, profits, or time periods involved, as opposed to data dependencies model of the business data, which keeps track of all logical relationships among all the possible data elements relevant to the business and its day-to-day operations A dimension may include several hierarchical levels of categories, for example the market dimension may contain, in descending order, such categories as country, region, state, and city, each category having its own number of specific instances. A hierarchical dimension reduces the total number of dimensions necessary to describe and organize the data, as compared with the situation where each category is represented by a separate dimension. The action of viewing data in greater detail by moving down the hierarchy of categories, i.e., by moving from parent to child category, is sometimes referred to as "drilling down" through the data. Quite naturally, the action of moving in the opposite direction, i.e., up the hierarchy of categories, to produce a more consolidated, higher-level view of data, is known as "drilling up" through the data.

The vast amounts of warehoused or otherwise collected business data would be useless without software tools for its analysis. Such tools are known under the collective name of Business Intelligence (BI) applications, an example of which is a suite of BI applications from Cognos Inc (Canada). BI applications provide, among others, data warehouse construction tools, as well as database querying, navigation and exploration tools, the latter including, among others, reporting, modeling, and visualization tools. Some of these tools combine new ways of data analysis and presentation with methods for discovering hidden patterns and previously unrecognized relationships among data, the approach known as data mining.

Among BI applications made available to the business community over the last few years, tools for visualizing business data are of particular importance. By interacting with person's sight, they became means of choice for consolidating and presenting vast amounts of complex information, in the manner which facilitates pattern recognition in the presented data and invites data exploration.

A characteristic feature of visualization applications is their extensive use of sophisticated and complex graphics presented dynamically to the user, typically on the screen of a computer monitor or a similar display device. Many actions taken by the application user when exploring the data require that the graphics displayed on the screen be quickly updated by the computer system. This updating, usually referred to as "screen repainting", is sometimes expected to take place on a frequent and quasi-instantaneous basis, for example, to create the illusion of a continuous motion of the image on the screen, when the user is panning the image (moving it horizontally or vertically over the screen), rotating it or zooming in or out. Depending on the complexity of the graphics presented on the screen and resources of the computer system running the application, the repainting of the screen may be a relatively time-consuming task resulting in some undesirable visual effects, such as "slide-show"-like presentation of the image motion instead of a quasi-continuous one.

An important factor affecting the screen repainting is the manner in which the visualization application interacts with the operating system run by the computer. In graphic user interface (GUI)-based operating systems, such as MS Windows, MAC OS, or X-Windows on Unix, an application running under the operating system has assigned what is called a message queue, which queues messages sent to the application by the operating system, informing the application about events taking place in various peripheral devices of the computer system, such as the keyboard or mouse, and/or requesting various actions to be taken by the application as a result. The present invention provides a new method of repainting the screen of a display device, in particular under conditions requiring frequent repainting of the screen, by using information provided by the message queue, which method is free of certain problems and limitations of similar prior art methods.

SUMMARY OF THE INVENTION

The present invention provides a method of rendering screen of a computer display device under conditions requiring frequent repainting of the screen, wherein the display device is a part of a computer system running an application under control of an operating system, the method comprising the steps of: a. detecting the onset of conditions requiring frequent repainting of the screen; b. obtaining from the operating system information necessary for repainting; c. partly repainting the screen; d. checking whether conditions of step a. still apply; and e. repeating steps b. through d. until the conditions of step a. no longer apply.

In a preferred embodiment, the operating system is MS Windows operating system, the application is a graphic visualization application, and steps a., b., and d. are carried out based on messages sent by the operating system to the application's message queue. These messages provide information about actions taken by the application user in respect of the scene presented on the screen. Certain navigation actions, such as panning, rotating, or zooming, may result in frequent repainting of the scene appearing on the screen, to reflect changes the scene undergoes as the navigation progresses. For graphically complex scenes, complete repainting of the scene may result in the user loosing visual clues of the navigation progress, as the changes to the scene observed on the screen may not reflect correctly actions taken by the user, for example the motion of the input device used by the user for the navigation. The method of the present invention addresses this problem by accepting an incomplete rendering of the scene being repainted as long as the navigation operation continues, to keep synchronized the observed changes to the scene with the progress of the navigation operation.

Other advantages, objects and features of the present invention will be readily apparent to those skilled in the art from the following detailed description of preferred embodiments in conjunction with the accompanying drawings and claims.

BRIEF DESCRIPTION OF THE DRAWINGS

The invention will now be described with reference to its preferred embodiments and the accompanying drawings, in which.

DETAILED DESCRIPTION OF THE PREFERRED EMBODIMENTS

Figure 1:
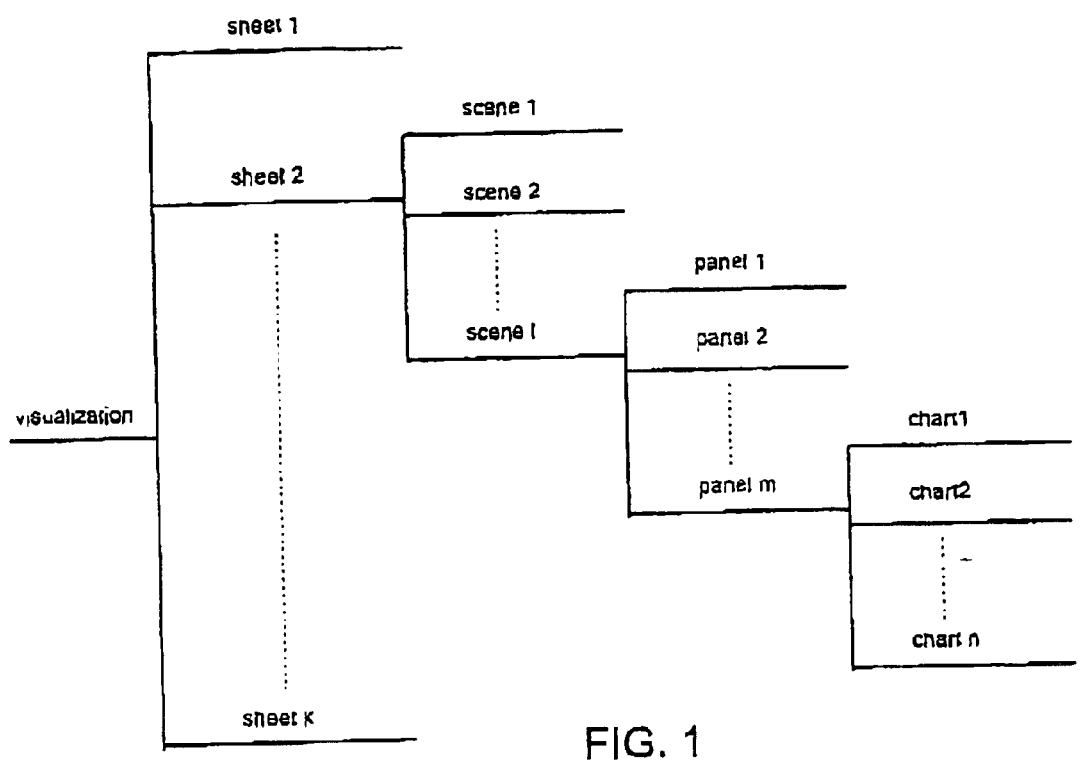
FIG. 1 is a diagram showing schematically the elements and hierarchical structure of a graphic visualization according to a preferred embodiment of the invention.

As used herein, the term "application" is understood as a high level software unable to run on a computer system without a suitable systems software, in particular an operating system managing at a low level the computer system's resources. The term "visualization" is understood as any graphical and interactive presentation of business or other data, consolidating in a limited space a large amount of complex information and summarizing it by a number of metrics or similar characteristics presented to the user in a highly visual and graphical form. The term "scene" is understood as an actual image of a visualization presented to the user on the screen of a display device of a computer system running a visualization application. This image, parts of which may be hidden from the user, may require updating resulting from various actions taken by the user "navigating" the scene. The term "navigation" is understood as any action taken or carried out by the application user, which action requires a frequently repeated repainting of the screen of the display device.

For the purpose of illustration, it will be in the following assumed that the visualization application is running under MS Windows operating system. In this system, as in any other GUI-based operating system, each application running under the system has assigned a message queue that stores (queues) messages sent to the application by the operating system when this application is active. Essentially, these messages advise the application about events taking place in peripheral devices of the computer system, which events may require some action to be taken by the application and/or require such an action from the system. In particular, messages requiring certain actions, such as screen repainting, may be requested by the application in response to an earlier message indicating that such an action is necessary. In this respect, examples of messages sent by the operating system may be WM_KEYDOWN or WM_KEYUP, informing that a key of the keyboard has been pressed down and released, respectively, WM_MOUSEMOVE, informing of the mouse pointer's new position, as the mouse is moved by the user, or WM_PAINT, when the application needs to redraw the contents of its window.

The application checks messages in its message queue one by one, normally checking for a next message when the action, if any, taken in response to the previous one is completed. If there are any messages waiting in the queue at the time of the check, the first message is removed from the queue, an appropriate action is taken, if necessary, the queue checked again, and so on. In the normal course of operation and as far as the repainting of the scene or window is concerned, the application reads the queue message after message, removing each read message from the queue and taking any necessary action or actions that such a message may require, until WM_PAINT message is encountered. This message is then removed from the queue, the scene (window) is repainted and the application reads the next message in the queue.

Visualizations according to the invention are preferably structured hierarchically, using visualization elements including, in the descending order, sheets, scenes, panels, and charts. The hierarchy of visualization elements means that a chart is a component of a panel, the panel is a component of a scene, the scene is a component of a sheet, and the sheet is a component of a visualization. The hierarchical structure of a visualization according to the invention is shown schematically in FIG. 1. The visualization shown diagramatically in FIG. 1 consists of k sheets (sheets 1 through k). Of those, the second sheet (sheet 2) consists of l scenes (scenes 1 through l). The lth sheet (sheet l) contains m panels (panels 1 through m), of which the mth panel (panel m) includes n charts (charts 1 through n). To avoid overcrowding, FIG. 1 shows visualization elements of an immediate lower level of hierarchy only for one visualization element of the immediate higher level of hierarchy. It is obvious, however, that this tree-like structure extends to each visualization element of each level of hierarchy above the level of chart. There are no limits and rules to follow when choosing the number of visualization elements of a given level of hierarchy when creating a visualization. In an extreme case, the visualization may even consist of a single chart (k=1=m=n=1 in the diagram of FIG. 1).

For the purpose of screen rendering, a scene presented to the user on the screen of a display device is usually decomposed into a number of simple graphic elements (objects) which are drawn on the screen in a predetermined order when the scene is being repainted, to reconstitute the scene as viewed by the user. Examples of such objects are a plane (a rectangular box drawing with optional text and/or image), a box (a rectangle filled with a single color), a sphere (a circle filled with a single color), a wedge (radially cut out part of a circle filled with a single color), a polyline (one or more lines drawn using one or more colors), a polygon (irregularly shaped object filled with a single color), a text (a textual label drawing using a single color and font), etc. For example, each chart (leaf) of the tree structure shown in FIG. 1 will normally require several such objects to be drawn to recreate the chart on the screen. Other objects will have to be drawn for visualization elements of higher levels of hierarchy or to appropriately label such elements on the screen.

Figure 2:
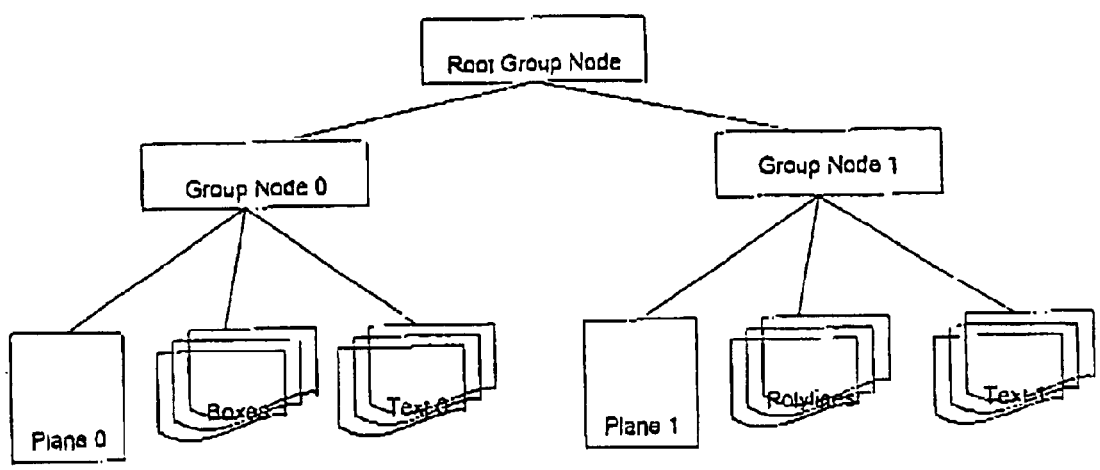
FIG. 2 is a diagram showing an exemplary scene graph of a scene to be rendered on the screen of a display device.

For the purpose of rendering a scene on the screen, objects included in the scene are preferably arranged in a tree-like structure called a scene graph. An example of such a scene graph is shown in FIG. 2. The scene graph shown in FIG. 2 uses objects called group nodes to form the tree. As in any tree structure, there is a single root node (Root Group Node of FIG. 2). Group nodes may have children group nodes (such as Group Node 0 and Group Node 1, children nodes of the Root Group Node in FIG. 2) and/or leaf nodes (nodes which have no children nodes below them, such as Plane 0, Boxes and Text 0 leaves of FIG. 2). Leaves of the scene graph are the objects which are drawn on the screen in a predetermined order when the scene is repainted. The order in which the leaves of the scene graph are drawn on the screen is usually determined by the method of tree traversal adopted for this purpose, according to rules well known to those skilled in the art. For example, the "in-order" traversal method applied to the scene graph of FIG. 2 would result in drawing first the leaves of Group Node 0 (in the order Plane 0, Boxes, and Text 0), followed by the leaves of Group Node 1, in a similar order (Plane 1, Polylines, and Text 1).

Traversing a scene graph to repaint the scene may be a time-consuming task for a graph having a large number of leaves, meaning that a relatively long period of time may be required to repaint the scene. This usually does not pose problems if screen repaintings are sufficiently spaced in time, i.e., are not supposed to take place very quickly one after another. However, this normally is not the case when the user navigates a scene. A navigation operation, such as panning, rotating, or zooming, requires that the scene be constantly updated (repainted), mostly to provide the user with a visual feedback of the progress of the navigation, and allow him to decide when the navigation can be terminated. For example, when panning an image to inspect its parts remaining outside the window, the user wants to know how much of the hidden part of the image has been brought so far into the window, in order either to continue or to terminate the navigation.

Clues about the navigation progress may be sometimes provided in the form of an outline of the navigated image (usually an empty box having its borders marked with a dashed line), which outline moves over the screen as the navigation progresses. However, such a moving outline may not provide enough feedback when the navigated image is a complex visualization scene, where it may be important to see at least some visualization elements as they move to decide whether the navigation should be continued or terminated.

From the user's perspective, a navigation operation is usually carried out using some standard input devices, in particular a mouse. Such a peripheral device is generally handled by the operating system, which sends appropriate messages to the message queue of an active application about events relevant to the mouse usage. The following may be an exemplary series of mouse messages sent to the application during a panning operation.

WM_RBUTTONDOWN
WM_MOUSEMOVE
WM_PAINT
WM_MOUSEMOVE
WM_PAINT
WM_MOUSEMOVE
WM_PAINT
WM_RBUTTONUP

The first message in the above series (WM_RBUTTONDOWN) means that the user pressed down the right mouse button. Followed by the message WM_MOUSEMOVE (while the right button remains in the depressed position), this is recognized by the application as the beginning of a panning operation. This implies that the scene needs to be repainted and the application informs the operating system that it needs a repaint. This results in the first WM_PAINT message being sent by the operating system and the scene is repainted as a result. However, since the panning may continue while the scene is being repainted (the mouse is still moving with the right button depressed), a next WM_MOUSEMOVE message is sent by the operating system, read by the application from the message queue, recognized as a need of a next repaint which is requested and executed, and so on. This cycling through the message queue continuous until the message WM_RBUTTONUP is received, signaling that the right mouse button has been released and that the panning operation is terminated. This may be followed by a final repainting of the scene.

If the scene being repainted during the panning operation is relatively simple (say, a few dozens of leaves in the scene graph), the time required for each repainting is usually so short that in the user's perception the still images of consecutive repaints blend into a continuous motion of the image as the mouse moves on. However, if the scene being repainted is very complex, with many hundreds or even thousands of leaves in its scene graph, its redrawing can be a time consuming task, meaning that the consecutive repaints will be more spaced in time and perceived by the user as a series of still images (a "slide-show" presentation). As a result, the user not only looses the feeling of "smooth navigation" but, more importantly, the visual feedback necessary to control the progress of the navigation operation. This will typically result in the mouse being moved further than necessary to achieve the intended navigation effect, as the mouse is moved by the user while the screen is being repainted. This, however, will be discovered only after the next repainting of the screen is completed, with the new "still frame" being a big jump from the previous one.

Figure 3:
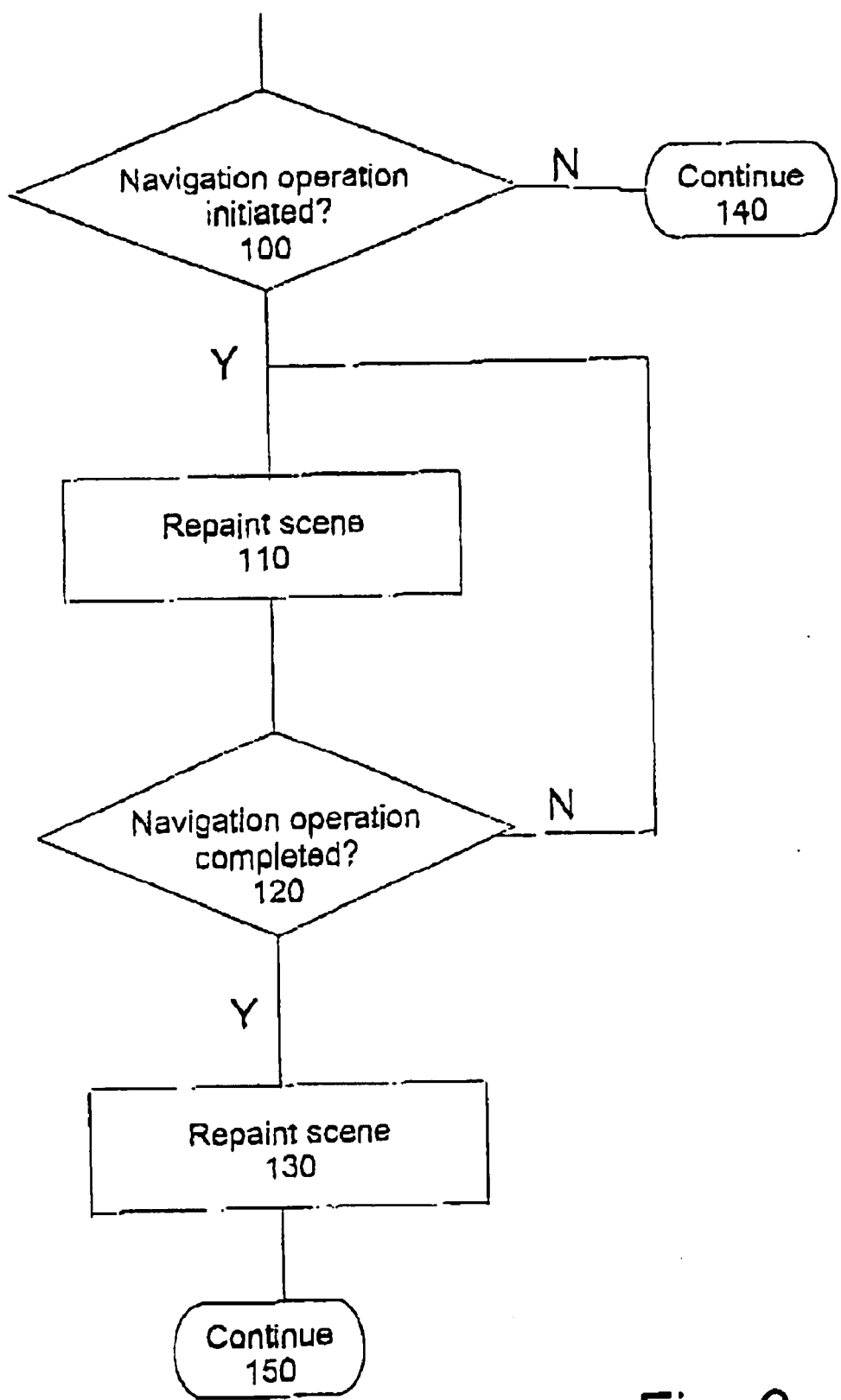
FIG. 3 is a flowchart showing the handling of screen rendering during a navigation operation according to prior art.

This prior art approach to the screen repainting during an navigation operation is shown schematically in the flowchart of FIG. 3. In step 100, by checking the message queue, the application determines if a navigation operation has been initiated. If this has not happened, the application continues (step 140) with an appropriate action, for example with checking again the message queue. If the beginning of a navigation operation is detected, the application repaints the scene (step 110) and, again by checking the message queue, determines in step 120 if the navigation operation has been completed. If this has not happened yet, the repainting 110 is repeated and condition 120 checked again. The latter cycle is repeated until the condition 120 is satisfied (the navigation is completed), in which case the scene is repainted for the last time and the application continues with an appropriate action (step 150), for example with checking the message queue.

As pointed out above, this approach results in an acceptable visual perception of the navigation operations by the user only when the scene is relatively simple (the corresponding scene graph with a limited number of leaves) and may create undesirable visual effects when the scene becomes too complex. This problem is alleviated, at least in part, by the method of the present invention, also referred to as the method of preemptive screen rendering, as it preempts the completion of the screen repainting if the navigation process is detected to be continuing while the repainting takes place.

According to the present invention, during the repainting of the screen due to an navigation operation started by the user, the message queue is checked periodically for navigation-related messages (and ignoring all other messages) sent to the message queue by the operating system, such as WM_MOUSEMOVE messages, while handling a current WM_PAINT message and repainting the screen. If a navigation-related message is found in the queue (meaning that the navigation process continued while the scene was being repainted), the current screen repainting process is terminated and a new repainting process is started, based on the information received in the navigation-related message retrieved from the queue. This cycle continues until the navigation operation is completed.

As by the time of the first check of the message queue for a next navigation-related message the repainting of the scene is usually not completed, the result at this point is a partly repainted scene. For example, for the scene graph of FIG. 2, these might be Polylines and Text 1 objects which were still waiting to be drawn when the repainting was terminated, so that these objects would be missing from the scene. Such a scene is flagged as partially rendered before checking the queue for new messages. If the scene is found to be flagged as partially rendered at the time when the navigation is completed, the scene is then fully rendered (repainted).

Figure 4:
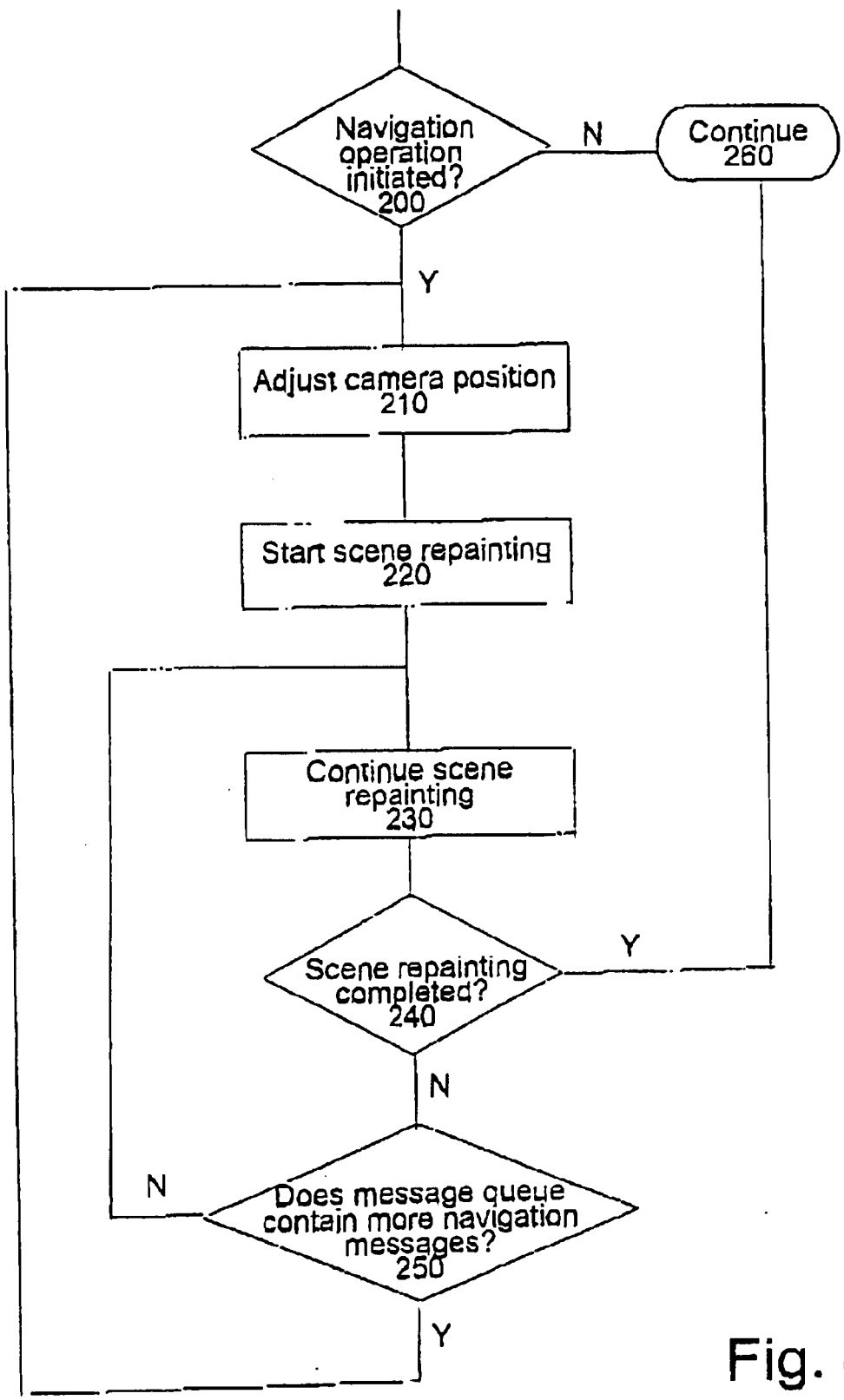
FIG. 4 is a flowchart showing the handling of screen rendering during a navigation operation according to a preferred embodiment of the present invention.

The above process of repainting the screen according to the invention is shown schematically in the flow diagram of FIG. 4. In step 200, by checking the message queue, the application determines if a navigation operation has been initiated. If this has not happened, the application continues (step 260) with an appropriate action, for example with checking again the message queue. If the beginning of a navigation operation is detected in step 200, the application adjusts in step 210 the camera position, i.e., determines the "look" of the scene to be repainted based on the information received in the navigation-related message retrieved in step 200. For example, if the user has zoomed in, the image must be correspondingly enlarged, with some parts of the scene possibly moving outside the window. If the user has panned, the image must be shifted accordingly.

After the camera position is adjusted, the application starts repainting the scene (step 220) based on the results of step 210. In step 220, which in some embodiments may be combined with step 230, the application draws a limited number of objects, such as plane and/or panel objects, whose rendering is never preempted to provide the user with certain minimum of visual information as to the current camera position (the progress of the navigation operation). As the number of objects drawn in step 220 is very limited, drawing these object has no perceptible effect on the navigation operation.

After the non-preemptable objects of the scene have been rendered, the application enters the preemptive rendering loop (steps 230, 240, and 250). In step 230 the scene repainting is continued by adding an additional, limited number of objects to the scene. According to a preferred embodiment, the number of objects rendered in step 230 is limited to a predetermined number of objects (leaves of the scene graph) to be rendered. This arbitrary number, which attempts to strike a balance between the time spent on repainting the scene and the time spent on checking the content of the message queue, depends on several factors, mostly on the processing speed of the central processing unit (CPU) of the computer system. In general, this number should be selected in such a way as to provide the user with the feeling of "smooth navigation" and visual feedback necessary to control the progress of the navigation operation under all circumstances, while maximizing the number of objects rendered before the complete repainting of the scene is preempted. In one preferred embodiment, it was found that ten objects added to the scene in step 230 meet these requirements for a broad range of processing speeds.

After the limited (predetermined) number of objects was rendered in step 230, the application checks in step 240 whether the scene repainting has been completed. For a very simple scene or a larger number of objects rendered in step 230, this might happen even before completing the preemptive rendering loop for the first time. If the repainting has been completed, the application exits the loop by proceeding to step 260 and continues reading the message queue.

If the repainting has not been completed (scene is only partially rendered), the application checks the message queue for navigation-related messages (step 250). If no such a message is found, the preemptive rendering loop is executed again starting from step 230. If a navigation-related message is found in the message queue, the repainting loop is repeated, starting from step 210, based on information retrieved from the message queue in step 250.

This method of rendering the screen during a navigation or similar operation requiring its frequent repainting provides a better feedback to the user navigating a graphically complex scene than methods of the prior art, for example those using an outline of the image being navigated to indicate the progress of navigation. While providing a visually acceptable impression of the continuity of motion of the image across the screen, the method of the present invention provides the user with sufficient clues of changes taking place in the navigated scene as the navigation progresses, thus facilitating decision-making by the user as to whether the navigation should be continued or terminated.

While the present invention has been described in connection with what is presently considered to be the most practical and preferred embodiments, it is to be understood that the invention is not limited to the disclosed embodiments, but is intended to cover various modifications and equivalent arrangements included within the spirit and the scope of the appended claims.

What is claimed is:

1. A method of rendering a screen of a computer display device under conditions requiring frequent repainting of the screen, the display device being a part of a computer system running a graphic visualization application under control of an operating system, the method comprising the steps of:
   a. detecting the onset of conditions requiring frequent repainting of the screen;
   b. obtaining from the operating system information necessary for repainting;
   c. partly repainting the screen by rendering a predetermined number of objects of a scene graph;
   d. checking whether the conditions of step a. still apply; and
   e. repeating steps b. through d. until the conditions of step a. no longer apply,
   the steps a., b., and d. being carried out based on messages sent by the operating system to the application's message queue, the screen displaying a graphically complex visualization scene represented in the computer system as the scene graph.

2. A method according to claim 1, wherein step c. is repeated and more objects are added to the scene if in step d. no navigation-related message is found in the message queue.

3. A method according to claim 2, wherein the screen is repainted in the order of traversing the scene graph.

4. A method according to claim 1, wherein the operating system is MS Windows operating system.

5. A method according to claim 1, wherein the conditions requiring frequent repainting of the screen are a result of a navigation operation initiated by an application user.

6. A method to claim 5, wherein the scene is navigated with an input device.

7. A method according to claim 6 wherein the input device is a mouse or a keyboard.

8. A method according to claim 5, wherein the navigation operation is selected from the group consisting of panning, rotating and zooming.

9. A computer based system for rendering on a screen of a computer display device under conditions requiring frequent repainting of the screen, the computer based system running a graphic visualization application under control of an operating system, the computer based system comprising:
   a. module for detecting the onset of conditions requiring frequent repainting of the screen;
   b. module for obtaining from the operating system information necessary for repainting;
   c. module for partly repainting the screen by rendering a predetermined number of objects of scene graph;
   d. module for determining whether the conditions still apply, the obtaining module, the repainting module and the determining module repeatedly operating while the conditions are apply,
   the detecting module, the obtaining module and the determining module being operated based on messages sent by the operating system to the application's message queue, the screen displaying a graphically complex visualization scene represented in the computer based system as a scene graph.

10. A computer based system according to claim 9, wherein the repainting module includes module for allowing more objects to be added to the scene when no navigation-related message is found in the message queue.

11. A computer based system according to claim 10, wherein the repainting module ensures that the screen is repainted in the order of traversing the scene graph.

12. A computer based system according to claim 9, wherein the operating system is MS Windows operating system.

13. A computer based system 9, wherein the conditions requiring frequent repainting of the screen are operatively coupled to a navigation operation initiated by an application user.

14. A computer based system according to claim 13, wherein the navigation operation is provided by an input device that accepts inputs from the application user.

15. A computer based system according to claim 13, wherein the navigation operation is selected from the group of consisting of panning, rotating and zooming.

16. A computer storage medium storing computer readable code embodied therein for rendering a screen of a computer display device under conditions requiring frequent repainting of the screen, the display device being a part of a computer system running a graphic visualization application under control of an operating system, comprising:
   a. code for detecting the onset of conditions requiring frequent repainting of the screen;
   b. code for obtaining from the operating system information necessary for repainting;
   c. module for partly repainting the screen by rendering a predetermined number of objects of scene graph;
   d. code for checking whether conditions of step a. still apply; and
   e. code for repeating the codes b. through d. until the conditions of the code a. no longer apply,
   the codes a., b., and d. being carried out based on messages sent by the operating system to the application's message queue, the screen displaying a graphically complex visualization scene represented in the computer system as the scene graph.

17. A computer storage medium according to claim 16, wherein the code c includes code for allowing more objects to be added to the scene when no navigation-related message is found in the message queue.

18. A computer storage medium according to claim 16, wherein the code c includes code for partly repainting the screen in the order of traversing the scene graph.

19. A computer based system according to claim 16, wherein the code c detects the onset of a result of a navigation operation initiated by an application user.

* * * * *